(12) United States Patent
Konishi

(10) Patent No.: US 7,561,106 B2
(45) Date of Patent: Jul. 14, 2009

(54) ELECTRONIC EQUIPMENT

(75) Inventor: Michihiro Konishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 237 days.

(21) Appl. No.: 10/861,503

(22) Filed: Jun. 7, 2004

(65) Prior Publication Data
US 2004/0217905 A1    Nov. 4, 2004

Related U.S. Application Data

(62) Division of application No. 09/813,145, filed on Mar. 21, 2001, now Pat. No. 6,775,133.

(30) Foreign Application Priority Data

Sep. 22, 2000  (JP)  ............................. 2000-289115

(51) Int. Cl.
*H01Q 1/38* (2006.01)
(52) U.S. Cl. ............................. 343/700 MS; 343/702; 455/575.7
(58) Field of Classification Search ................. 343/702, 343/700 MS, 767; 455/575.7
See application file for complete search history.

(56) References Cited

U.S. PATENT DOCUMENTS

| | | | | |
|---|---|---|---|---|
| 4,073,460 | A | 2/1978 | Dale | 248/441 |
| 4,197,544 | A * | 4/1980 | Kaloi | 343/700 MS |
| 4,291,311 | A | 9/1981 | Kaloi | 343/700 |
| 5,557,288 | A | 9/1996 | Kato et al. | 343/702 |
| 5,566,913 | A | 10/1996 | Prokop | 248/118 |
| 5,677,698 | A * | 10/1997 | Snowdon | 343/702 |
| 5,747,786 | A | 5/1998 | Cargin, Jr. et al. | 235/472 |
| 5,811,786 | A | 9/1998 | Rockstein et al. | 235/472 |
| 5,890,074 | A | 3/1999 | Rydbeck et al. | 455/558 |
| 5,903,548 | A | 5/1999 | Delamater | 370/310 |
| 5,933,122 | A | 8/1999 | Sauer et al. | 343/876 |
| 5,943,214 | A | 8/1999 | Sato et al. | 361/752 |
| 5,945,954 | A * | 8/1999 | Johnson | 343/702 |

(Continued)

FOREIGN PATENT DOCUMENTS

DE    38 13 565 A1    11/1989

(Continued)

OTHER PUBLICATIONS

European Search Report dated Dec. 4, 2002.

(Continued)

*Primary Examiner*—Douglas W. Owens
*Assistant Examiner*—Ephrem Alemu
(74) *Attorney, Agent, or Firm*—Kratz, Quintos & Hanson, LLP.

(57) ABSTRACT

The electronic equipment includes a housing accommodating an electronic circuit used in the operation of the device and a high-frequency circuit for wireless communication related to the operation of the device. A dielectric antenna is mounted on the rear surface of the housing near a lateral end thereof. Since the electronic circuit for operation and the high-frequency circuit for wireless communication are provided in the housing, it is not necessary to connect a personal computer and a mobile telephone by a cable thus making the device mobile. Further, since the dielectric antenna connected to the high-frequency circuit is mounted on the rear surface of the housing, the antenna characteristics can be improved and stabilized.

3 Claims, 13 Drawing Sheets

U.S. PATENT DOCUMENTS

| | | | |
|---|---|---|---|
| 5,966,098 A * | 10/1999 | Qi et al. | 343/702 |
| 6,115,762 A | 9/2000 | Bell et al. | 710/62 |
| 6,148,183 A | 11/2000 | Higdon et al. | 455/90 |
| 6,157,344 A * | 12/2000 | Bateman et al. | 343/700 MS |
| 6,230,003 B1 | 5/2001 | Macor | 455/412 |
| 6,285,328 B1 * | 9/2001 | Masaki et al. | 343/702 |
| 6,320,545 B1 * | 11/2001 | Nagumo et al. | 343/700 MS |
| 6,339,400 B1 * | 1/2002 | Flint et al. | 343/702 |
| 6,362,786 B1 * | 3/2002 | Asano et al. | 343/702 |
| 6,414,642 B2 * | 7/2002 | Honda et al. | 343/702 |
| 6,429,819 B1 * | 8/2002 | Bishop et al. | 343/700 MS |
| 6,430,405 B1 | 8/2002 | Jambhekar et al. | 455/403 |
| 6,531,985 B1 * | 3/2003 | Jones et al. | 343/702 |
| 6,538,606 B2 * | 3/2003 | Quinn et al. | 343/702 |
| 6,728,559 B2 * | 4/2004 | Masaki | 455/575.5 |

FOREIGN PATENT DOCUMENTS

| | | |
|---|---|---|
| EP | 0 434 231 A2 | 6/1991 |
| EP | 0 570 138 A2 | 11/1993 |
| EP | 0 590 534 | 4/1994 |

OTHER PUBLICATIONS

Partial European Search Report dated Aug. 27, 2002.

* cited by examiner

F I G. 5
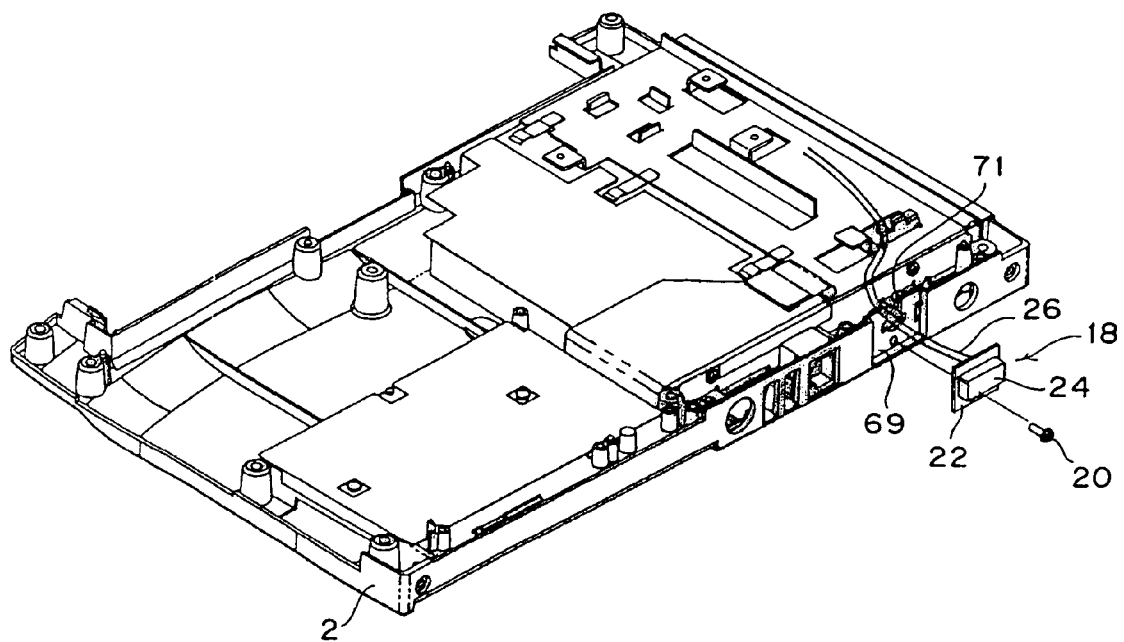

F I G. 13
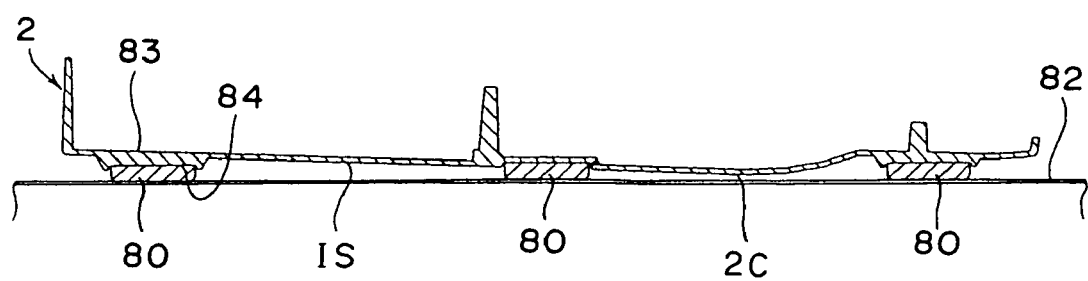

ELECTRONIC EQUIPMENT

This application is a Divisional Application of U.S. application Ser. No. 09/813,145, filed Mar. 21, 2001, now U.S. Pat. No. 6,775,133.

BACKGROUND OF THE INVENTION

1. Field of the Invention

The present invention relates generally to electronic equipment such as an information processing device, and more particularly to electronic equipment (portable information equipment) such as a personal computer suitable for use as a mobile (movable) terminal.

2. Description of the Related Art

In recent years, a personal computer designed for personal use has become widespread. By connecting a personal computer to the Internet via a public line and a commercial provider (line connection organization), information retrieval and electronic mail exchange can be easily made.

On the other hand, a display (e.g., liquid crystal display) suitable for high-density integration and thinning of an electronic circuit has been put to practical use, and in association therewith various laptop, notebook, and any other portable personal computers are currently on the market. By connecting a portable personal computer to a public line through a wireless communication tool such as a mobile telephone and a PHS, the portable personal computer can be used as a so-called mobile terminal.

In the case of connecting a portable personal computer through a mobile telephone, for example, to a public line, it is necessary to connect the personal computer and the mobile telephone by a cable according to predetermined specifications prior to operating the mobile telephone. Accordingly, it is troublesome to use the personal computer as a mobile terminal.

It is therefore an object of the present invention to provide electronic equipment such as a personal computer which can be easily used as a mobile terminal.

The other objects of the present invention will become apparent from the following description.

SUMMARY OF THE INVENTION

According to the present invention, the function of a mobile telephone or a PHS for connection to a public line is incorporated in a personal computer in order that the personal computer can be easily used as a mobile terminal. More generally, there is provided electronic equipment incorporating a high-frequency circuit for wireless communication.

In the case of performing wireless communication, an antenna connected to the high-frequency circuit is indispensable. Recently, a dielectric antenna has been put to practical use as an antenna suitable for size reduction. The dielectric antenna has a surface formed with first and second conductor patterns having predetermined shapes. The first conductor pattern is connected to the high-frequency circuit, and the second conductor pattern is grounded to a conductive housing of the electronic equipment, for example. In this case, the antenna characteristics tend to change according to the mounting position of the dielectric antenna. Accordingly, in the electronic equipment incorporating the high-frequency circuit, it has been examined to optimize the mounting position of the dielectric antenna.

In accordance with a first aspect of the present invention, there is provided electronic equipment adapted to be operated by an operator in facing positional relationship therewith. This electronic equipment comprises a housing accommodating a circuit for wireless communication, and a dielectric antenna connected to the circuit. The dielectric antenna is provided on a rear surface of the housing near a lateral end thereof.

With this arrangement, an electronic circuit for operation and a high-frequency circuit for wireless communication can be provided in the housing. Accordingly, it is not necessary to connect a personal computer and a mobile telephone by a cable according to predetermined specifications as in the prior art, so that it is possible to provide electronic equipment which can be easily used as a mobile terminal. Further, since the dielectric antenna is mounted on the rear surface of the housing near a lateral end thereof, the antenna characteristics can be improved and stabilized.

In accordance with a second aspect of the present invention, there is provided electronic equipment having a wireless communication function. This electronic equipment comprises a housing accommodating a circuit for wireless communication and an electronic circuit for operation different from wireless communication, and a switch for controlling the operation of the circuit for wireless communication independently of the operation of the electronic circuit.

In accordance with a third aspect of the present invention, there is provided electronic equipment adapted to be placed on a substantially horizontal surface in use. This electronic equipment comprises a housing having a lower surface including an inclined surface inclined with respect to the substantially horizontal surface, and a plurality of pads mounted on the lower surface of the housing. The inclined surface is formed with a foot portion for mounting each pad so that each pad has a uniform thickness.

In accordance with a fourth aspect of the present invention, there is provided electronic equipment comprising a dielectric antenna having a surface formed with a conductor pattern having a predetermined shape; a substrate having a first surface and a second surface, the dielectric antenna being mounted on the first surface; and a coaxial connector mounted on the second surface of the substrate. The substrate has a ground pattern between the dielectric antenna and said coaxial connector.

In accordance with a fifth aspect of the present invention, there is provided electronic equipment comprising a housing having a recess; a functional module accommodated in the recess; a lid provided on the housing for covering the functional module, the lid being adapted to be opened/closed or detached/attached; a flexible printed circuit board interposed between the functional module and the lid, the flexible printed circuit board having one end connected to an electronic circuit provided in the housing; and a connector mounted to the other end of the flexible printed circuit board for detachably connecting the flexible printed circuit board to a side surface of the functional module. The flexible printed circuit board is introduced from the side opposite to the lid to the connector.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 5 is a perspective view of an essential part of a body housing of the device;

FIG. 13 is a cross section taken along the line XIII-XIII in FIG. 12.

DETAILED DESCRIPTION OF THE PREFERRED EMBODIMENTS

A preferred embodiment of the present invention will now be described in detail with reference to the attached drawings.

Figure 1:
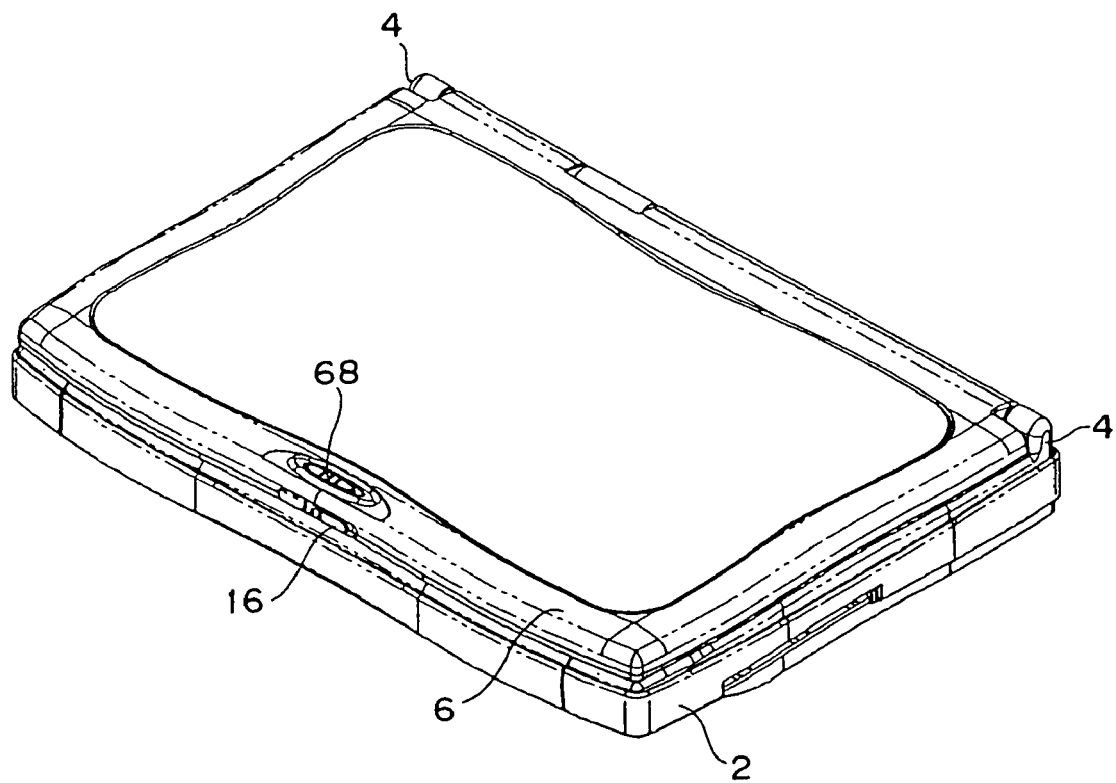
FIG. 1 is a perspective view showing a preferred embodiment of an information processing device as the electronic equipment according to the present invention as viewed from the front side thereof in a closed condition.
Figure 2:
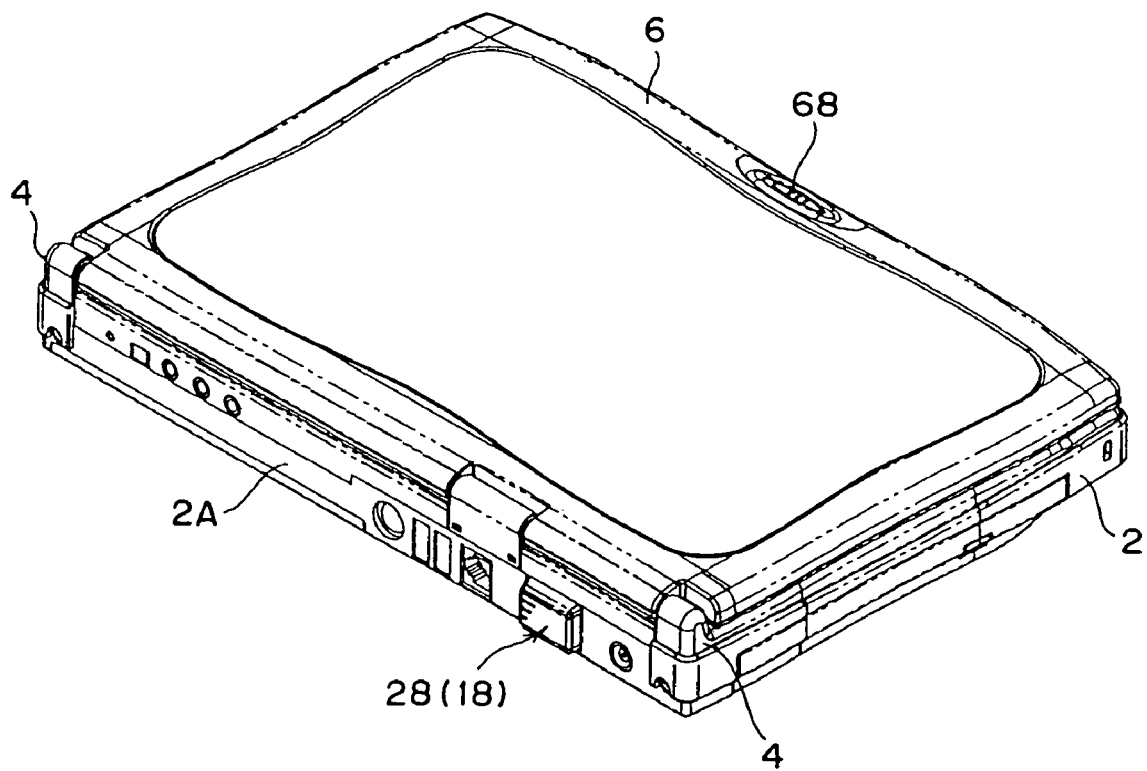
FIG. 2 is a perspective view of the device as viewed from the rear side thereof in the closed condition.
Figure 3:
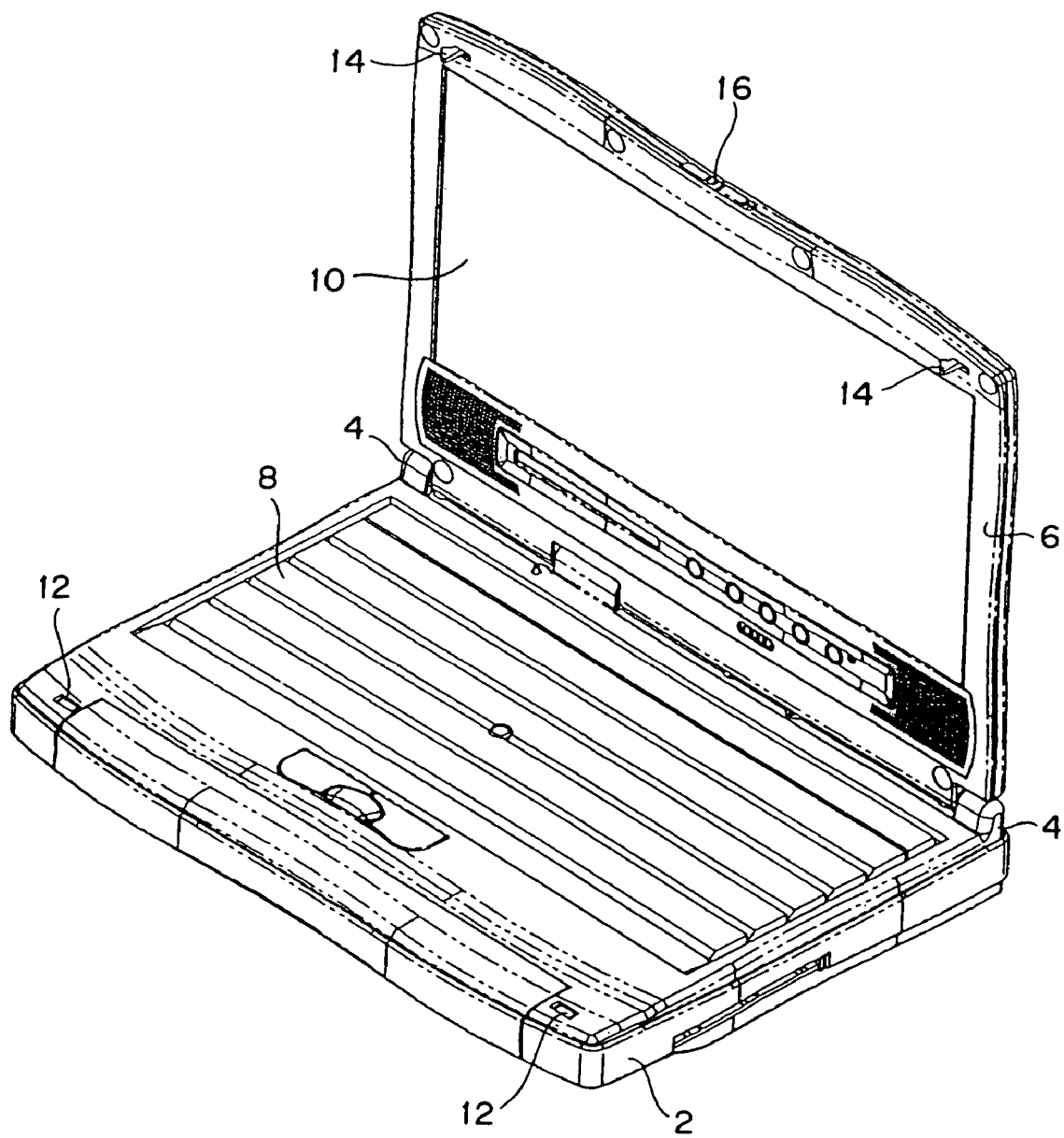
FIG. 3 is a perspective view of the device as viewed from the front side thereof in an open condition.
Figure 4:
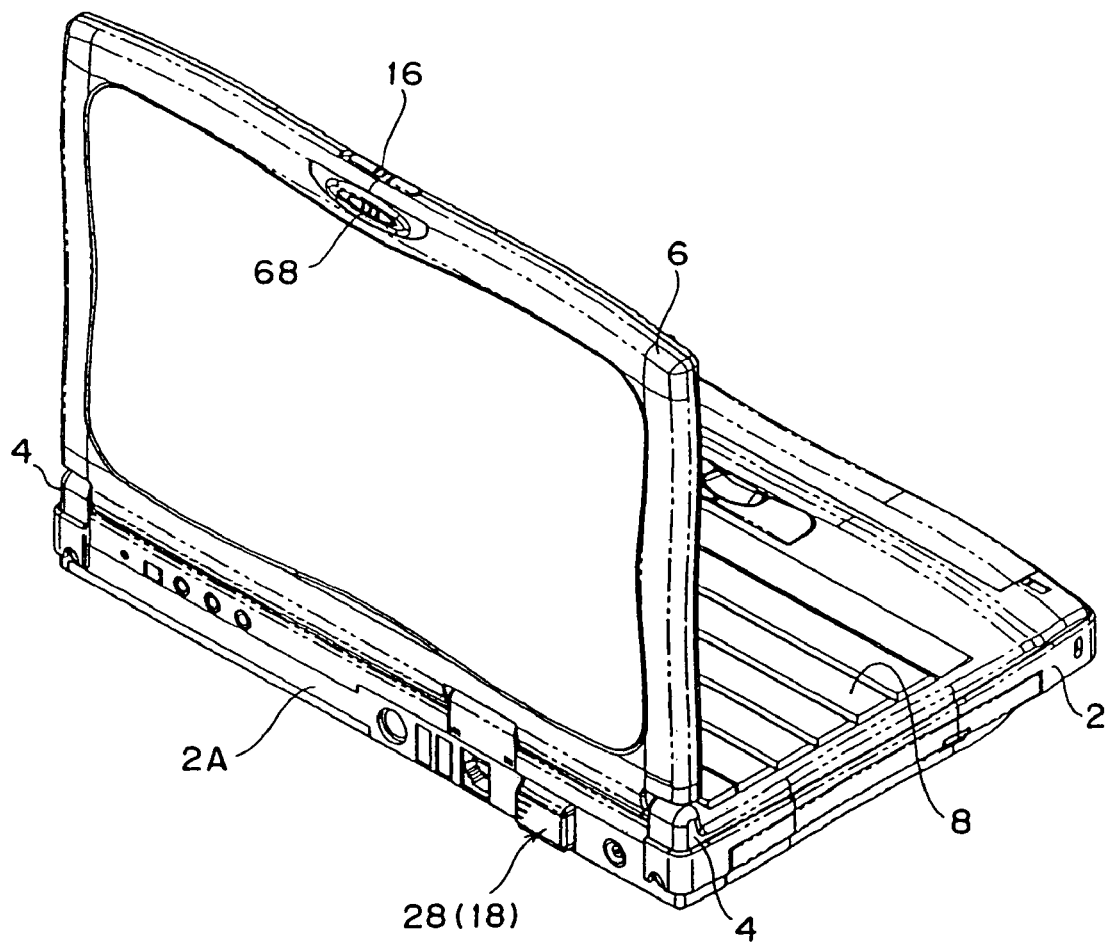
FIG. 4 is a perspective view of the device as viewed from the rear side thereof in the open condition.

FIGS. 1 to 4 are perspective views showing a preferred embodiment of an information processing device as the electronic equipment according to the present invention. This device may be a laptop, notebook, or any other portable personal computer. This device includes a body housing 2 and a subhousing 6 pivotably supported to the body housing 2 by a pair of hinged portions 4. FIGS. 1 and 3 are front perspective views of the device as viewed from the front side thereof in relation to the operation by an operator, and FIGS. 2 and 4 are rear perspective views of the device as viewed from the rear side thereof in relation to the operation by the operator. Further, FIGS. 1 and 2 show a closed condition of the subhousing 6 with respect to the body housing 2, and FIGS. 3 and 4 show an open condition of the subhousing 6 with respect to the body housing 2.

As best shown in FIG. 3, the body housing 2 is provided with a keyboard unit 8 for use in data inputting or the like in relation to the operation, and the subhousing 6 is provided with a display unit 10 for use in displaying in relation to the operation. The display unit 10 includes an LCD (liquid crystal display) panel, for example. A pair of engaging portions (e.g., holes) 12 are formed at a front end portion of the body housing 2, and a pair of hooks 14 adapted to engage the engaging portions 12 are provided on the subhousing 6 at positions corresponding to the engaging portions 12. The hooks 14 are limitatively movable by a slider 16 provided at the front end of the subhousing 6 opposite to the hinged portions 4, so that the subhousing 6 can be locked in its closed condition with respect to the body housing 2, and this locked condition of the subhousing 6 can be canceled by operating the slider 16.

Figure 6:
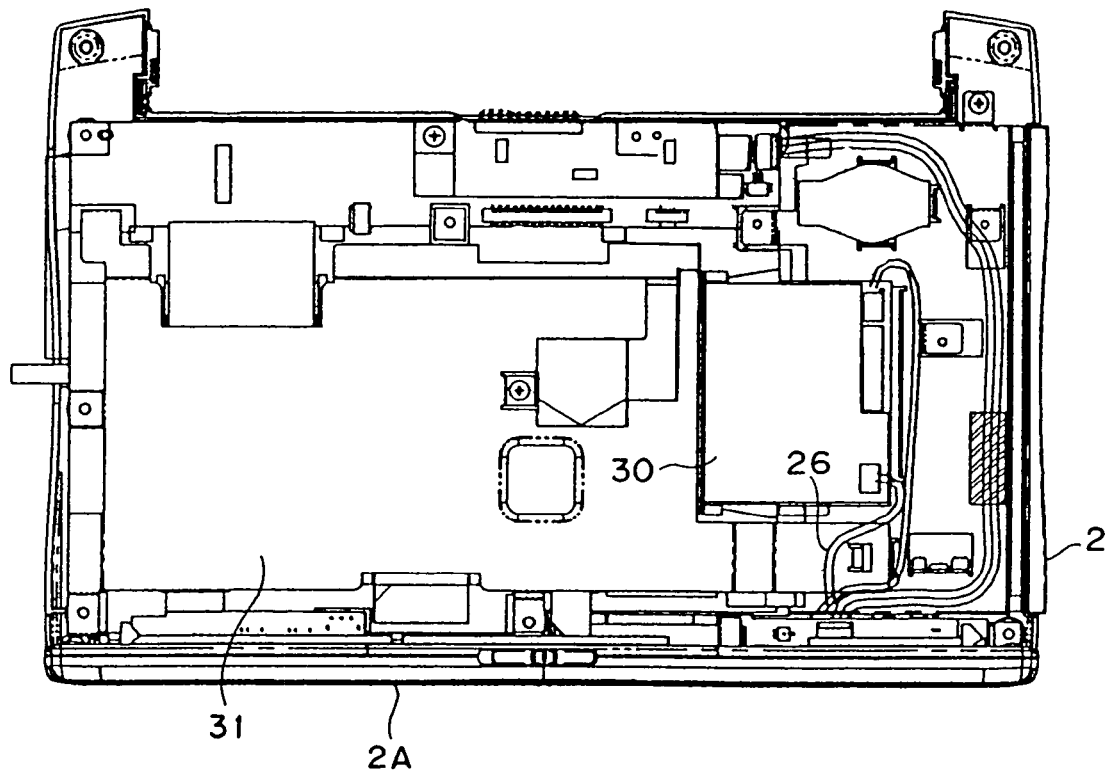
FIG. 6 is a plan view of the essential part shown in FIG. 5.

FIG. 5 is a perspective view of an essential part of the body housing 2 as viewed from the rear side thereof, and FIG. 6 is a plan view of this essential part. An antenna assembly 18 for use in wireless communication by the connection of this device to a public line, for example, is mounted on the rear surface of the body housing 2 near a lateral end thereof by means of a screw 20. The antenna assembly 18 includes a substrate 22 and a dielectric antenna 24 surface-mounted on the substrate 22. As best shown in FIG. 6, the antenna assembly 18 is connected through a coaxial cable 26 to a high-frequency module 30 accommodated in the body housing 2. A mother board 31 providing an electronic circuit related to the operation by the use of the keyboard unit 8 (see FIG. 3) or the like is also accommodated in the body housing 2.

Figure 7A:
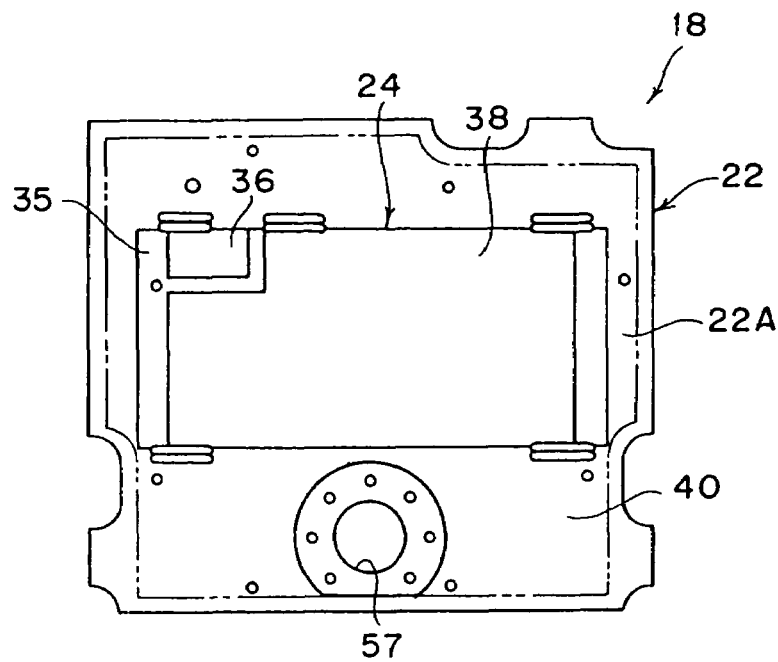
FIGS. 7A and 7B are plan views of an antenna assembly and a substrate, respectively, as viewed from the side of a dielectric antenna.
Figure 7B:
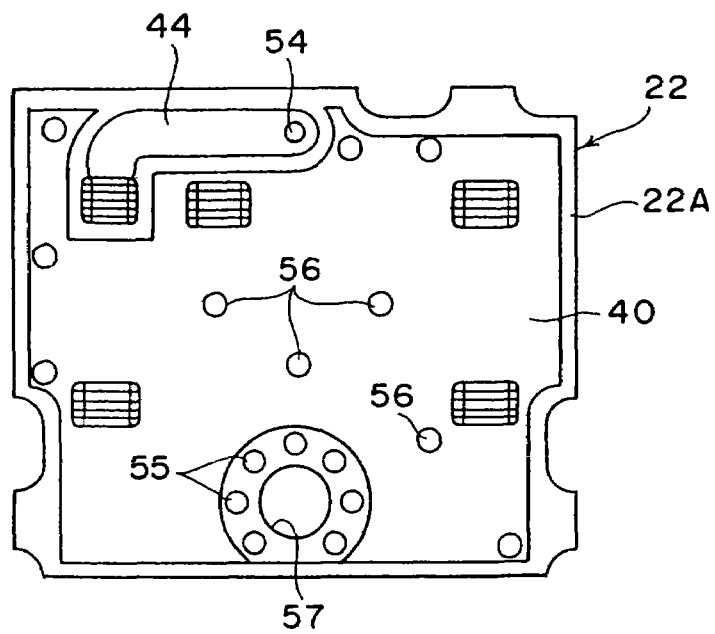
Figure 8A:
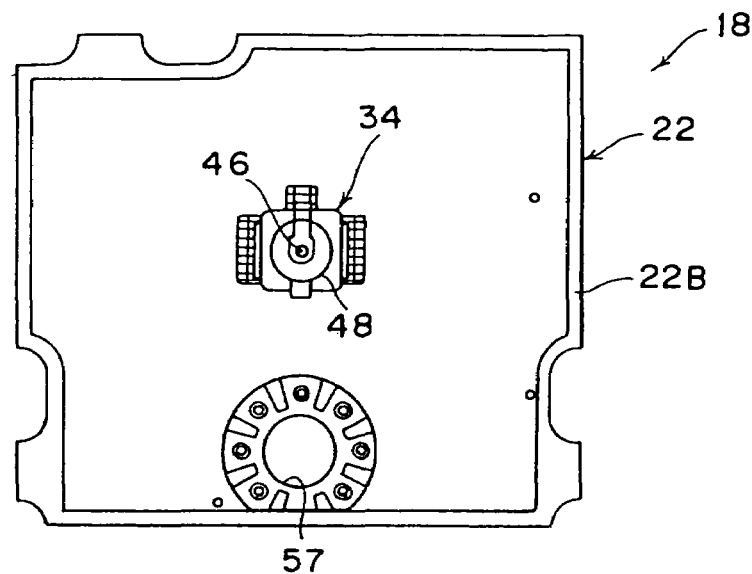
FIGS. 8A and 8B are plan views similar to FIGS. 7A and 7B, respectively, as viewed from the side of a coaxial connector opposite to the dielectric antenna.
Figure 8B:
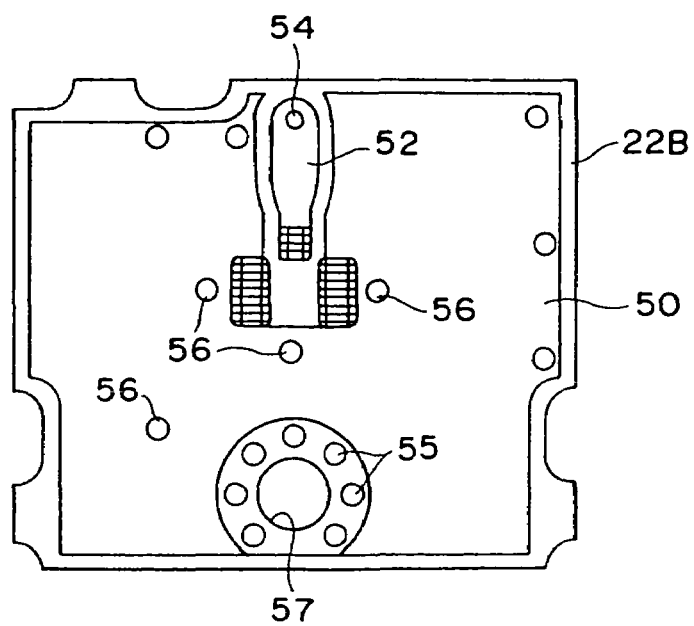

FIGS. 7A and 8A are plan views of the antenna assembly 18 as viewed from the same side as the dielectric antenna 24 and the opposite side thereof, respectively, and FIGS. 7B and 8B are plan views of the substrate 22 respectively corresponding to FIGS. 7A and 8A. The substrate 22 has a first surface 22A and a second surface 22B. The second surface 22B is opposed to the body housing 2. The dielectric antenna 24 and a coaxial connector 34 are fixed by surface mounting to the first surface 22A and the second surface 22B, respectively. The coaxial cable 26 (see FIG. 5) is connected to the coaxial connector 34.

As best shown in FIG. 7A, the dielectric antenna 24 is composed of a dielectric chip 35 and first and second conductor patterns 36 and 38 formed on the surface of the dielectric chip 35. The first and second conductor patterns 36 and 38 have predetermined shapes. The first conductor pattern 36 is soldered at one position to a feeder pattern 44 formed on the first surface 22A of the substrate 22, and the second conductor pattern 38 is soldered at four positions to a ground pattern 40 formed on the first surface 22A of the substrate 22.

As best shown in FIG. 8A, the coaxial connector 34 has a signal terminal 46 and a ground terminal 48 provided so as to surround the signal terminal 46. The signal terminal 46 is soldered at one position to a feeder pattern 52 formed on the second surface 22B of the substrate 22, and the ground terminal 48 is soldered at two positions to a ground pattern 50 formed on the second surface 22B of the substrate 22. The coaxial connector 34 is located at a substantially central position of the substrate 22.

The feeder patterns 44 and 52 are connected by a via 54 extending through the substrate 22, and the ground patterns 40 and 50 are also connected by a plurality of vias 56 extending through the substrate 22. Accordingly, the dielectric antenna 24 can be connected to the high-frequency module 30 by the coaxial cable 26 connected to the coaxial connector 34. Further, by forming the body housing 2 from a conductor such as metal (e.g., alloy containing magnesium as a principal component), the second conductor pattern 38 of the dielectric antenna 24 can be connected to the body housing 2 only by tightening the screw 20 to press the substrate 22 against the body housing 2.

To improve the connection of the second conductor pattern 38 and the body housing 2, a plurality of (e.g., seven as shown) vias 55 are provided around a through hole 57 formed through the substrate 22 for insertion of the screw 20, and solder bumps are formed at the whole or a part (e.g., alternate ones) of the vias 55, thereby improving electrical connection when tightening the screw 20 to press the substrate 22 against the body housing 2. As shown in FIG. 5, the substrate 22 is mounted on a thin-walled or recessed seating portion 69 formed on the rear surface of the body housing 2 near its lateral end. The seating portion 69 is formed with a notch 71 for insertion of the coaxial cable 26. As shown in FIG. 2, a cap 28 for covering the antenna assembly 18 is mounted on the body housing 2 for the purposes of protection, good appearance, etc. The cap 28 is formed by molding of a metal-free material such as plastic, so as to suppress an influence on antenna gain.

The reason for mounting the antenna assembly 18 on the body housing 2 rather than on the subhousing 6 which is easily displaceable is that the antenna characteristics can be stabilized and that the coaxial cable 26 can be sufficiently shortened to prevent an increase in loss. Further, the reason for mounting the antenna assembly 18 on the rear surface of the body housing 2 is to prevent that the antenna characteristics may become unstable because of the influence of the operator and to minimize the influence of electromagnetic waves radiated from the antenna on the human body. For example, in the case that the antenna assembly 18 is mounted on the front surface or side surface of the body housing 2, there is a possibility that the antenna characteristics may vary according to the motion of the operator. Further, the reason for mounting the antenna assembly 18 near the lateral end on the rear surface of the body housing 2 is to improve the antenna characteristics as compared with the case of mounting the antenna assembly 18 at a central portion on the rear surface of the body housing 2. If the antenna assembly 18 is mounted at the central portion, it has been confirmed by experiment that the electric fields induced in the body housing 2 by the dielectric antenna 24 cancel each other to deteriorate the antenna characteristics.

The reason for interposing the substrate 22 between the dielectric antenna 24 and the coaxial connector 34 as shown in FIGS. 7A and 8A is to prevent that variations in relative positional relation between the coaxial connector 34 and the coaxial cable 26 may have a direct influence on the antenna characteristics. The coaxial cable 26 is easily rotationally displaceable relative to the coaxial connector 34. Accordingly, if the dielectric antenna 24 and the coaxial connector 34 are provided on the same side with respect to the substrate 22, there is a possibility of changes in electromagnetic characteristics such as impedance characteristics between the dielectric antenna 24 and the body housing 2. According to this preferred embodiment, the substrate 22 has the ground patterns 40 and 50 between the dielectric antenna 24 and the coaxial connector 34, the above possibility of variations in antenna characteristics can be eliminated to thereby allow stable wireless communication.

Figure 9:
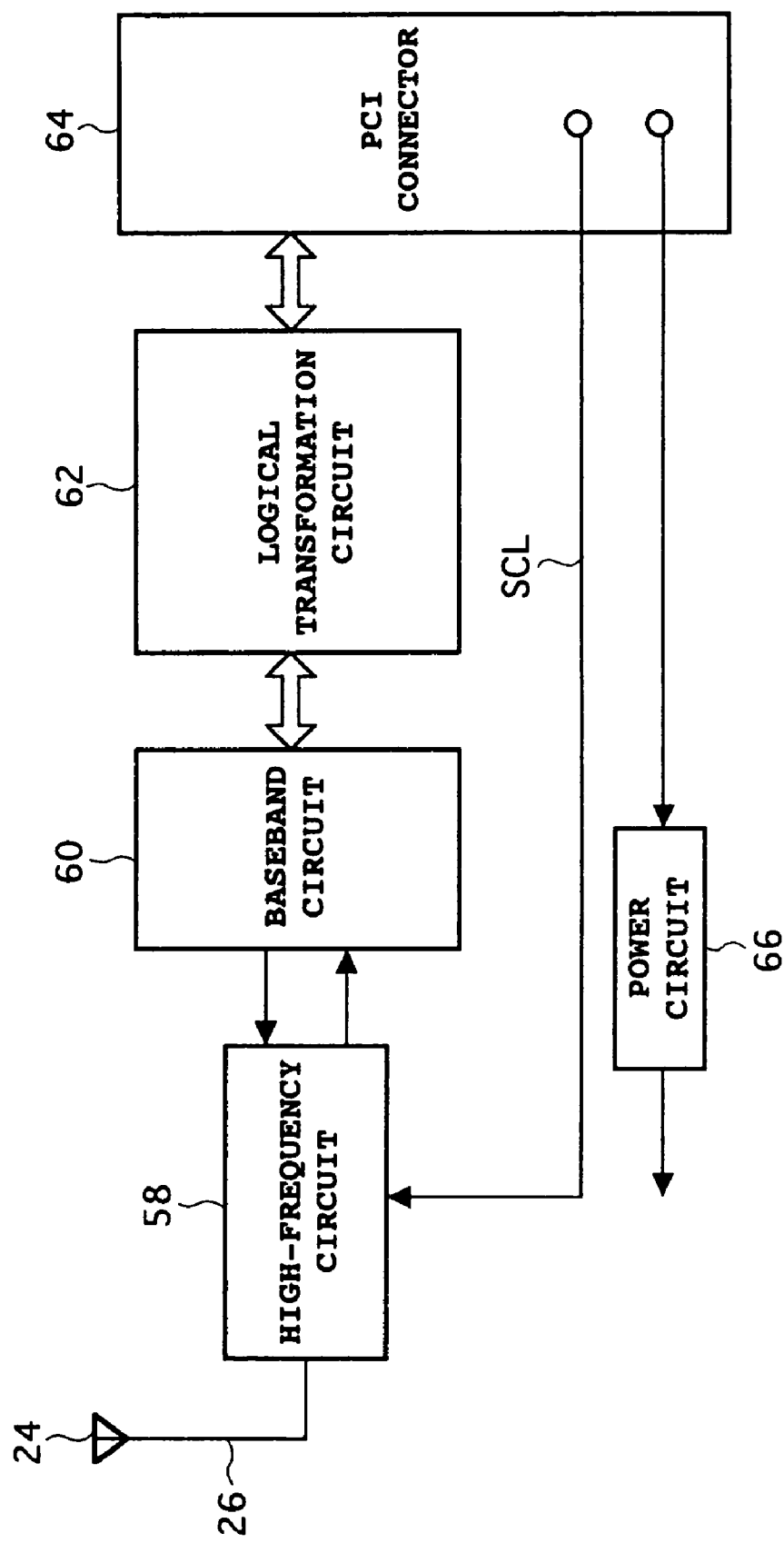
FIG. 9 is a block diagram of a high-frequency module.

FIG. 9 is a block diagram of the high-frequency module 30. The high-frequency module 30 is provided to be intended to connect this device to a public line, for example, and to provide the function of a mobile telephone or a PHS. The high-frequency module 30 has a high-frequency circuit 58 connected through the coaxial cable 26 to the dielectric antenna 24. The high-frequency circuit 58 is connected to a baseband circuit 60 to perform transmission and reception of data or the like. The baseband circuit 60 is connected through a logical transformation circuit 62 to a PCI connector (or mini-PCI connector) 64 by bidirectional buses. The PCI connector 64 has a plurality of terminals assigned to interface between the high-frequency module 30 and the mother board 31. By using at least one of the terminals of the PCI connector 64, a transmit/receive stop control signal is supplied from the mother board 31 through a stop control line SCL to the high-frequency circuit 58. Reference numeral 66 denotes a power circuit for supplying power through the PCI connector 64 to each circuit.

For example, in the case that this device is used in an airplane or a hospital in which the radiation of high-frequency electromagnetic waves must be minimized, there is a case that only the function of wireless communication is to be turned off and the other functions are desired to be kept on. In this preferred embodiment, such a demand is met by using the stop control line SCL to temporarily turn off the high-frequency circuit 58. Such temporary switching on/off of the high-frequency circuit 58 may be made by switching on/off the power supplied to the high-frequency circuit 58 or by switching on/off an oscillator (e.g., VCO) (not shown) incorporated in the high-frequency circuit 58.

In this preferred embodiment, the transmit/receive stop control signal is generated by a slide switch 68 (see FIG. 1, for example) provided on the outer surface of the subhousing 6. The slide switch 68 is positioned in the vicinity of the slider 16 for mechanical locking of the subhousing 6. Thus, by operating the slide switch 68 to generate the transmit/receive stop control signal, only the function of wireless communication can be temporarily turned off very easily.

In the case of connecting this device to a public line through wireless communication, an electric field strength related to the public line is required to be sufficiently large. In this respect, this preferred embodiment employs a circuit for detecting an electric field strength at a position where this device is placed, and an indicator element for indicating the electric field strength detected by this detecting circuit. The indicator element may be provided by an LED (light emitting diode) adapted to change the brightness of illumination or the frequency or intervals of flashing according to the electric field strength detected. This LED may be incorporated in the slide switch 68. In this case, the slide switch 68 has a transparent or translucent movable portion, and the LED emits visible light through the movable portion. With this arrangement, it can be easily checked whether or not this device can be stably connected to a public line.

Figure 10:
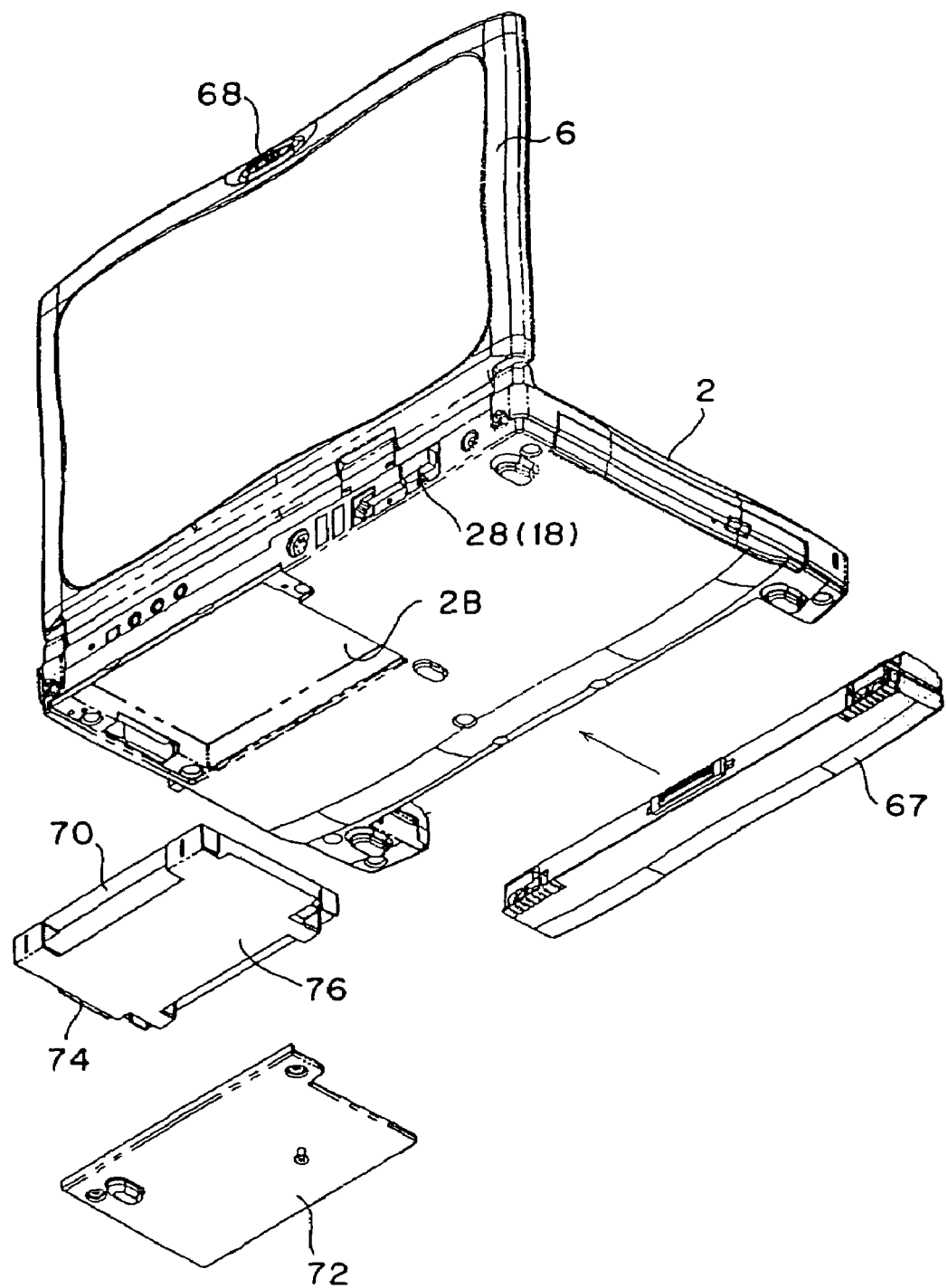
FIG. 10 is an exploded perspective view of the device as viewed from the bottom rear side thereof.

FIG. 10 is an exploded perspective view of this device as viewed from the rear lower side thereof. A battery pack 67 incorporating a battery is detachably provided on the front surface of the body housing 2. The lower surface of the body housing 2 is formed with a recess 2B for accommodating a hard disk drive 70 as a storage device for a personal computer. The hard disk drive 70 is wrapped by a damper 76 and accommodated in the recess 2B. In this condition, a lid 72 for covering the lower surface of the hard disk drive 70 is mounted on the body housing 2. A flexible printed circuit board (FPC) 74 is interposed between the hard disk drive 70 and the damper 76, i.e., between the hard disk drive 70 and the lid 72. The hard disk drive 70 is connected through the FPC 74 to the mother board 30 mounted in the body housing 2. The lid 72 is detachably mounted on the body housing 2 by a screw. Alternatively, the lid 72 may be pivotably mounted at its one end to the body housing 2 so as to be opened and closed.

Figure 11:
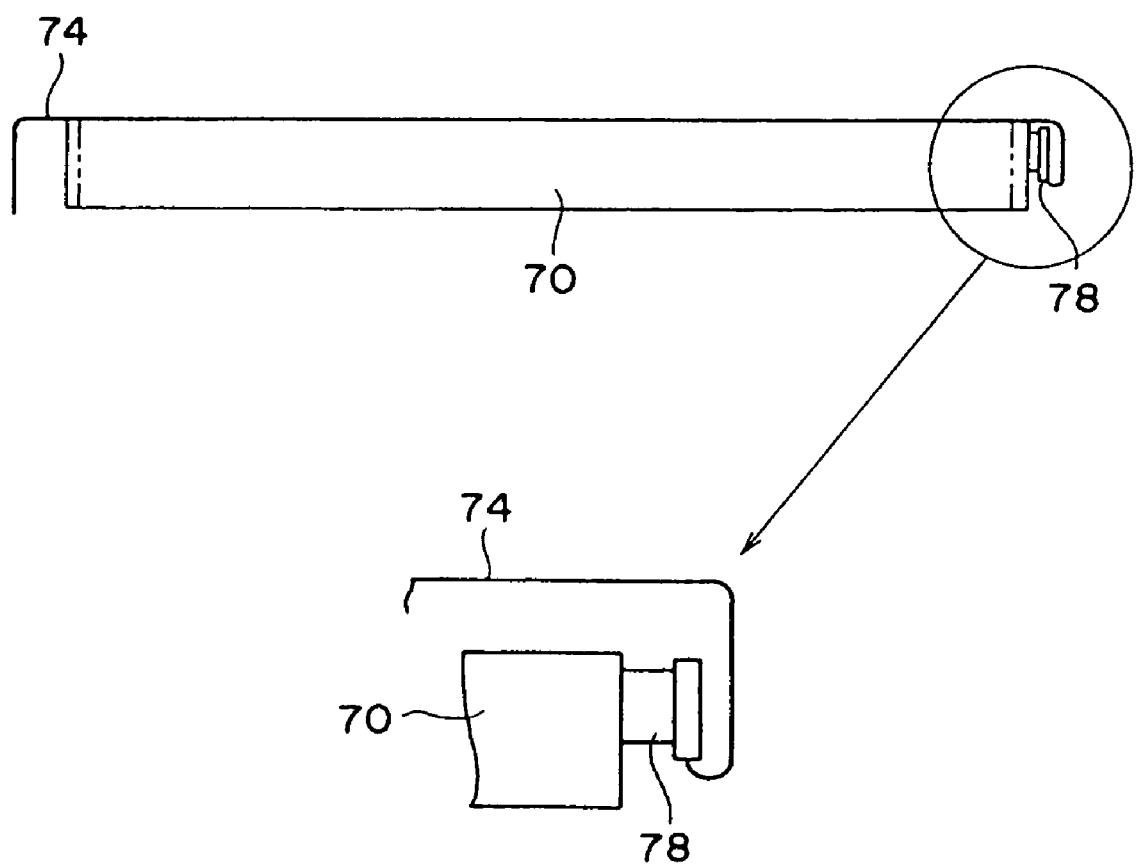
FIG. 11 is a side view showing the relation between a hard disk drive and an FPC (flexible printed circuit board)

FIG. 11 is a side view showing the relation between the hard disk drive 70 and the FPC 74 shown in FIG. 10. In FIG. 11, an encircled portion is enlarged as depicted by an arrow. The hard disk drive 70 is provided with a connector 78. The FPC 74 is connected at its longitudinal one end to the connector 78, and the other end of the FPC 74 is connected to the mother board 30 (see FIG. 6). The connector 78 is adapted to detachably connect the FPC 74 to a side surface of the hard disk drive 70. In this preferred embodiment, the FPC 74 is introduced from the side opposite to the lid 72 (located above the hard disk drive 70 as viewed in FIG. 11) to the connector 78. With this arrangement, it is possible to prevent that the connector 78 may be undesirably removed from the hard disk drive 70 by the detachment/attachment or opening/closing of the lid 72.

In the case of interposing a FPC between a hard disk drive and a lid in the prior art, it is generally considered that the FPC is introduced from the same side as the lid to the connector. In this case, when closing the lid to the body housing, the elasticity of an extra-length portion of the FPC is exerted in a direction of removing the connector from the hard disk drive. Accordingly, there is a possibility that the connector may be removed from the hard disk drive after completing the manufacture or modification of the device.

To the contrary, this preferred embodiment can eliminate the above problem. That is, the FPC 74 is introduced from the side opposite to the lid 72 to the connector 78. Therefore, the elasticity of an extra-length portion of the FPC 74 is exerted in a direction of pressing the connector 78 against the hard disk drive 70 by the closing operation of the lid 72 with respect to the body housing 2. Accordingly, it is possible to prevent that the connector 78 may be removed from the hard disk drive 70 after completing the manufacture or modification of this device.

The reason for exchangeability of the hard disk drive 70 with respect to the body housing 2 is to allow this device to easily support modifications related to an increase in storage capacity of a hard disk drive, for example.

Figure 12:
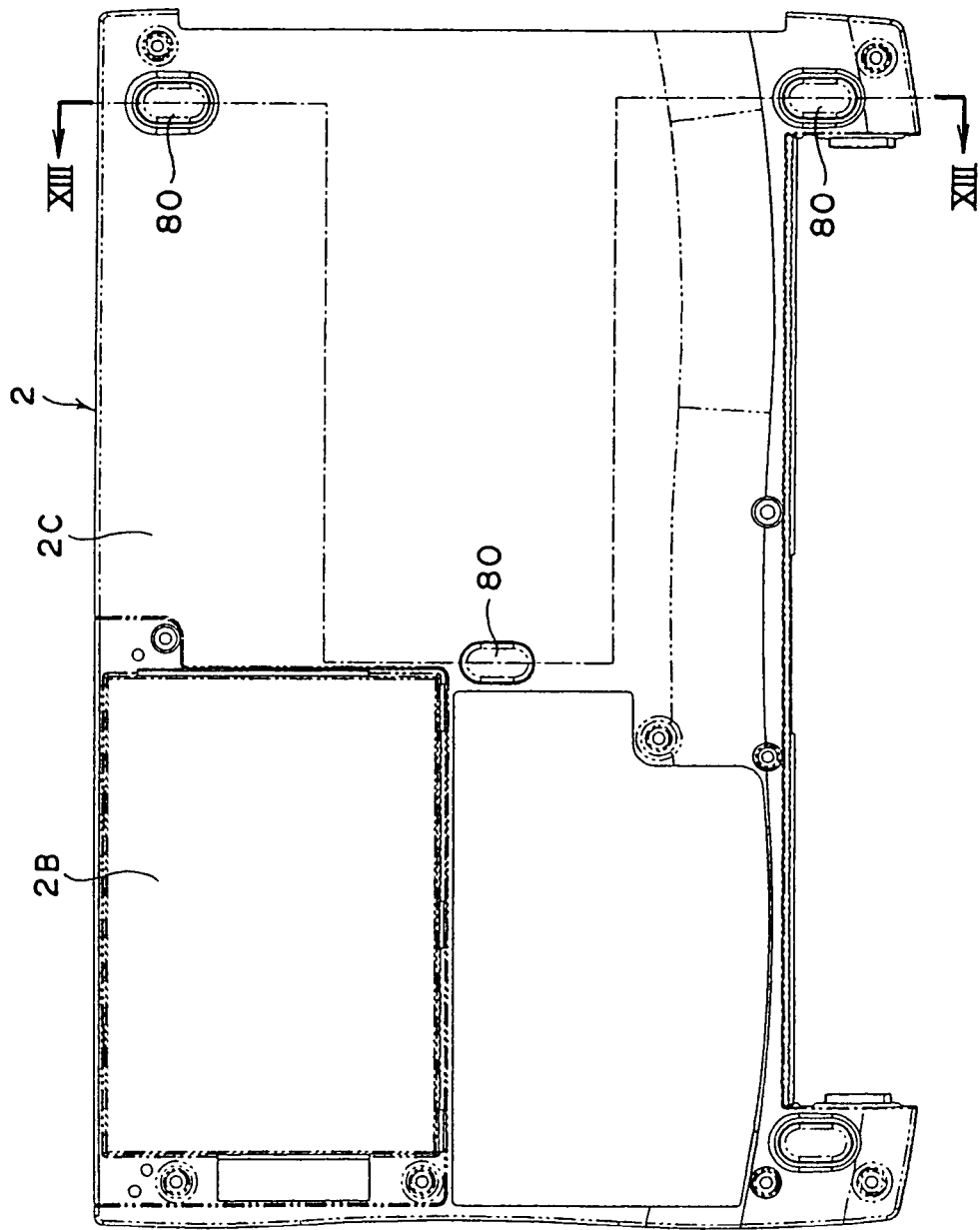
FIG. 12 is a bottom plan view of the body housing.

FIG. 12 is a bottom plan view of the essential part of the body housing 2, and FIG. 13 is a cross section taken along the line XIII-XIII in FIG. 12. This device is designed to be placed on a substantially horizontal surface 82 in use, and a plurality of pads 80 formed of an elastic material such as rubber are provided on a lower surface 2C of the body housing 2 for the purposes of generating a relatively large frictional force between the horizontal surface 82 and the lower surface 2C to thereby suppress the slippage of the device on the horizontal surface 82 and also suppressing the transmission of vibrations or the like from the horizontal surface 82 to the device.

As best shown in FIG. 13, the lower surface 2C of the body housing 2 includes an inclined surface IS inclined with respect to the horizontal surface 82. The inclined surface IS is intended to incline the device as a whole to the operator, thereby improving the operability. Further, the inclined surface IS is formed with foot portions 83 for mounting the pads 80, so as to make the thickness of each pad 80 uniform. More specifically, each foot portion 83 of the body housing 2 has a thickness gradually changing in the longitudinal direction of the body housing 2 (in the horizontal direction as viewed in FIG. 13) so that each foot portion 83 has a substantially horizontal pad mounting surface 84.

With this arrangement, a plurality of pads having substantially the same shape can be used as the pads 80, thereby allowing a reduction in kind of parts of the device to largely contribute to a cost reduction. Further, since the thickness of each pad 80 is uniform, it is not necessary to consider the directionality of the pads 80 in mounting the pads 80 onto the lower surface 2C of the body housing 2, thereby improving the workability in manufacturing the device.

While the antenna assembly 18 is mounted on the body housing 2 formed of a conductor such as metal, so as to obtain the ability of the antenna assembly 18 to the maximum in the above preferred embodiment, the present invention is not intended to be limited to the above preferred embodiment. For example, the body housing 2 may be formed of an insulating material such as plastic, and a metallic thin film may be formed on the surface of the body housing 2 by ion plating or vapor deposition. In this case, the ground of the antenna assembly 18 is closely fitted with the metallic thin film. Alternatively, the ground of the antenna assembly 18 may be closely fitted with a metal fitting, and this metal fitting may be connected to the metallic thin film.

According to the present invention as described above, it is possible to provide electronic equipment such as a personal computer which can be easily used as a mobile terminal.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. Electronic equipment comprising:
    a dielectric antenna having a surface formed with a conductor pattern having a predetermined shape;
    a substrate having a first surface and a second surface, said dielectric antenna being mounted on said first surface; and
    a coaxial connector mounted on said second surface of said substrate;
    said substrate having a ground pattern between said dielectric antenna and said coaxial connector, wherein:
    said ground pattern comprises first and second ground patterns formed on said first and second surfaces of said substrate, respectively; said first and second ground patterns being connected by a via extending through said substrate.

2. Electronic equipment according to claim 1, wherein:
    said conductor pattern of said dielectric antenna comprises first and second conductor patterns; said first conductor pattern being connected to said first ground pattern; said coaxial connector comprising a signal terminal and a ground terminal; said ground terminal being connected to said second ground pattern; said second conductor pattern of said dielectric antenna and said signal terminal of said coaxial connector being connected by a feeder pattern formed on said substrate.

3. Electronic equipment according to claim 1, further comprising:
    a housing on which said substrate is mounted, said housing being formed of a conductor said second ground pattern of said substrate being connected to said housing.

* * * * *